US008345664B2

(12) United States Patent
Harada et al.

(10) Patent No.: US 8,345,664 B2
(45) Date of Patent: Jan. 1, 2013

(54) IP COMMUNICATION APPARATUS

(75) Inventors: Akira Harada, Kanagawa (JP); Hideki Iizuka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 958 days.

(21) Appl. No.: 12/352,096

(22) Filed: Jan. 12, 2009

(65) Prior Publication Data

US 2009/0180469 A1 Jul. 16, 2009

(30) Foreign Application Priority Data

Jan. 11, 2008 (JP) ............................ P. 2008-004567
Jul. 31, 2008 (JP) ............................ P. 2008-197597

(51) Int. Cl.
*H04L 12/66* (2006.01)

(52) U.S. Cl. ..................... 370/352; 370/263; 348/14.02; 704/2; 704/235

(58) Field of Classification Search .................. 370/352, 370/263; 455/517; 709/201; 358/1.13, 1.15
See application file for complete search history.

(56) References Cited

U.S. PATENT DOCUMENTS 7,522,929 B2 * 4/2009 Hashizume .................. 455/517
2005/0041604 A1 * 2/2005 Tighe et al. .................. 370/263
2005/0162680 A1 * 7/2005 Sekiguchi et al. ........... 358/1.13
2006/0206560 A1 * 9/2006 Kanada ......................... 709/201
2007/0133437 A1 6/2007 Wengrovitz et al.
2008/0117454 A1 * 5/2008 Sakata ......................... 358/1.15
2009/0245758 A1 * 10/2009 Kodama et al. ............... 386/124

FOREIGN PATENT DOCUMENTS

JP 05-284536 A 10/1993
JP 08-307456 A 11/1996
JP 2003-092632 A 3/2003
JP 2004-015369 1/2004
JP 2004-179689 A 6/2004

* cited by examiner

*Primary Examiner* — Albert T Chou

(74) *Attorney, Agent, or Firm* — McDermott Will & Emery LLP

(57) ABSTRACT

An IP communication apparatus employed in a telephone voice/moving picture recording system is comprised of: an IP packet transmitting/receiving I/F for transmitting/receiving an IP packet; an IP address acquiring unit of acquiring an IP address corresponding to a transmission source of the IP packet; a signal judging unit for performing a signal judging operation by employing data contained in an IP packet; a recording unit for recording the data in relation to the IP address based upon a judgment result made by the signal judging unit; and a recording control unit for controlling the recording unit.

17 Claims, 5 Drawing Sheets

101
102
IP PACKET TRANSMITTING/RECEIVING I/F
103
IP ADDRESS ACQUIRING UNIT
104
SIGNAL JUDGING UNIT
105
RECORDING UNIT
106
RECORDING CONTROL UNIT

MICRO-PHONE I/F
CAMERA I/F
IP PACKET TRANSMITTING /RECEIVING I/F
301
302
102
101
104
VOICE PRESENT/ABSENT JUDGING UNIT
201
IMAGE MOTION JUDGING UNIT
202
REPETITION JUDGING UNIT
203
SIGNAL JUDGING UNIT
303
OPERATION UNIT
IP ADDRESS ACQUIRING UNIT
103
304
SPEECH RECOGNIZING UNIT
PERSONAL EDGE DETECT-ING UNIT
305
306
TIME INSTANT ACQUIRING UNIT
RECORDING UNIT
105
RECORDING CONTROL UNIT
106

IP PACKET TRANSMITTING/ RECEIVING I/F
102
101
VOICE PRESENT/ABSENT JUDGING UNIT
201
IMAGE MOTION JUDGING UNIT
202
REPETITION JUDGING UNIT
203
SIGNAL JUDGING UNIT
104
OPERATION UNIT
303
IP ADDRESS ACQUIRING UNIT
103
SPEECH REC-OGNIZING UNIT
304
PERSONAL EDGE DETECT-ING UNIT
305
TIME INSTANT ACQUIRING UNIT
306
RECORDING UNIT
105
RECORDING CONTROL UNIT
106

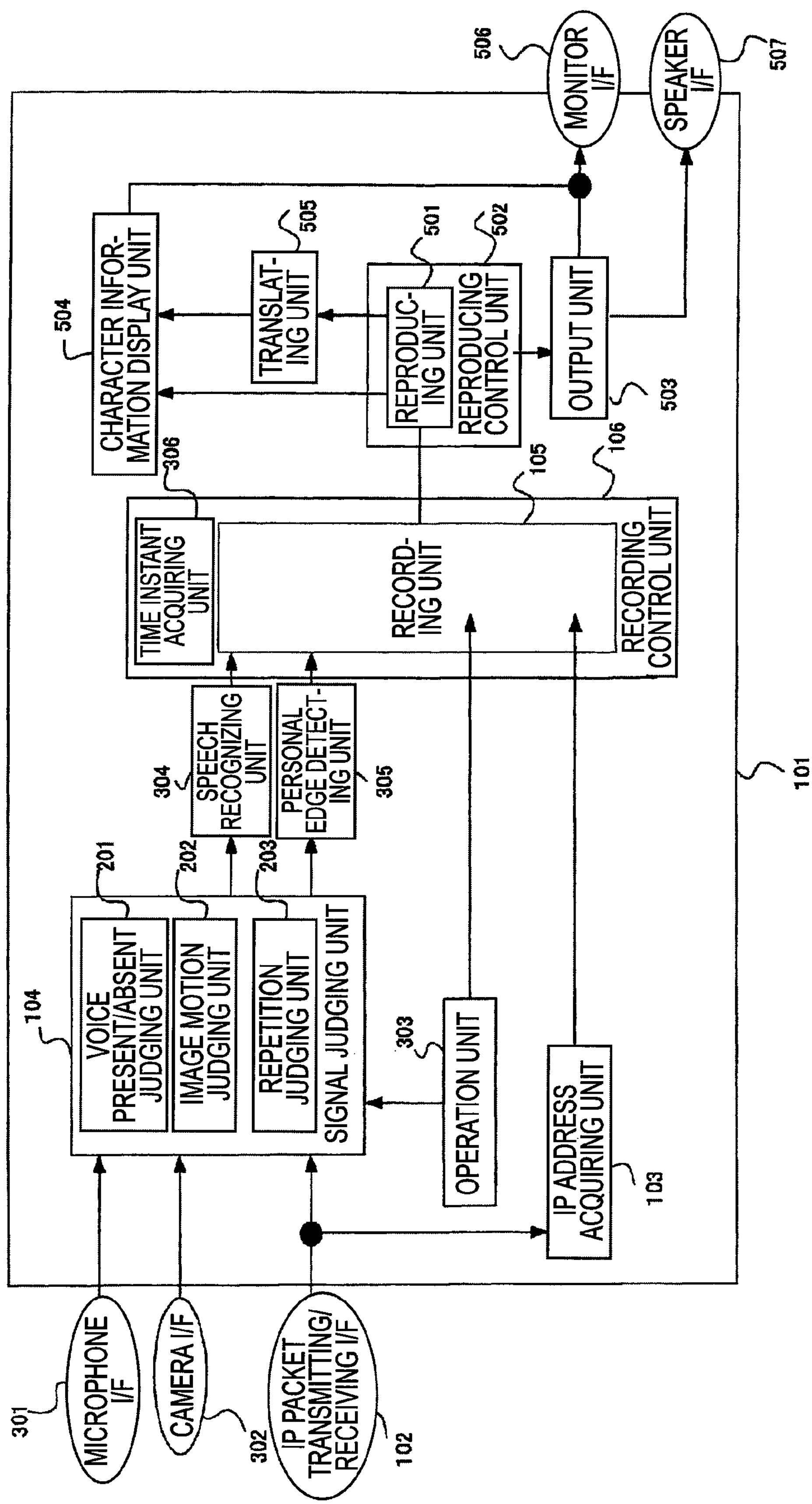
FIG. 5
MICROPHONE I/F
301
CAMERA I/F
302
IP PACKET TRANSMITTING/ RECEIVING I/F
102
101
104
VOICE PRESENT/ABSENT JUDGING UNIT
201
IMAGE MOTION JUDGING UNIT
202
REPETITION JUDGING UNIT
203
SIGNAL JUDGING UNIT
303
OPERATION UNIT
IP ADDRESS ACQUIRING UNIT
103
304
SPEECH RECOGNIZING UNIT
PERSONAL EDGE DETECT-ING UNIT
305
TIME INSTANT ACQUIRING UNIT
306
RECORD-ING UNIT
105
RECORDING CONTROL UNIT
106
CHARACTER INFOR-MATION DISPLAY UNIT
504
TRANSLAT-ING UNIT
505
REPRODUC-ING UNIT
501
REPRODUCING CONTROL UNIT
502
OUTPUT UNIT
503
MONITOR I/F
506
SPEAKER I/F
507

IP COMMUNICATION APPARATUS

BACKGROUND OF THE INVENTION

1. Field of the Invention

The present invention is related to an IP communication apparatus that is utilized in a telephone voice/moving picture recording system.

2. Description of the Related Art

Very recently, the VoIP (Voice over IP) has been rapidly popularized as extension systems of enterprises. While characteristics of IP telephones are effectively utilized, various sorts of conference systems have been conducted to enterprises. Among these conference systems, rapid development may be expected in television conference systems in the near future. Generally speaking, recording of proceedings and reproducing of the recorded proceedings are regularly carried out not only in usual conferences, but also in television conferences, Web conferences, voice conferences, and the like. To this end, such a technical idea that contents of television conferences and voice conferences are stored in the form of voice and moving pictures so as to constitute proceedings records has been proposed (refer to patent publication 1).

Patent Publication 1: JP-A-2004-15359

However, in such a case that proceedings are held among a plurality of bases, voice/moving picture data are recorded in response to a total number of these bases, so that data amounts functioning as a record of proceedings are increased. Also, in such a case where voice/moving picture data as to proceedings held among a plurality of bases are recorded in combination with each other, when the recorded data is reproduced, it cannot easily specify that each of speech is originated from which base. It should be noted that the above-described technical idea may be applied not only conference systems, but also telephone apparatuses capable of recording/reproducing voice and moving picture, and electronic appliances which mounts thereon IP functions.

SUMMARY OF THE INVENTION

An object of the present invention is to provide an IP communication apparatus capable of reducing an amount of recorded data even when a total number of bases functioning as communication counter parties is increased.

The present invention corresponds to an IP communication apparatus utilized in a telephone voice/moving picture recording system, and is featured by providing such an IP communication apparatus comprising: an IP packet transmitting/receiving I/F for transmitting/receiving an IP packet; an IP address acquiring unit of acquiring an IP address corresponding to a transmission source of the IP packet; a signal judging unit for performing a signal judging operation by employing data contained in the IP packet; a recording unit for recording the data in relation to the IP address based upon a judgment result made by the signal judging unit; and a recording control unit for controlling the recording unit.

Also, in the above-described IP communication apparatus, the signal judging unit judges whether or not a voice is present.

Also, in the above-described IP communication apparatus, the signal judging unit judges a motion of an image.

Also, in the above-described IP communication apparatus, the signal judging unit performs a repetition judging operation.

Also, in the above-described IP communication apparatus, the above-described signal judging unit is provided with any one of the voice present/absent judging operation, the image motion judging operation, and repetition judging operation.

Also, in the above-described IP communication apparatus, the above-described signal judging operation is carried out by employing voice data inputted from a microphone provided in the IP communication apparatus.

Also, the above-explained IP communication apparatus performs the above-described signal judging operation by employing moving picture data entered from a camera provided in the IP communication apparatus.

Also, in the above-described IP communication apparatus, the signal judging unit which performs the voice present/absent judging operation judges whether or not each of the data contained in the IP packet and the voice data inputted from the microphone contains a voice; and the recording control unit controls the recording unit not to record both data contained in the IP packet and the voice data, which are equivalent to a non-voice portion for a time duration longer than, or equal to a predetermined time. In accordance with the above-described structure, the data judged as no voice is not recorded in the recording unit, so that an amount of the recorded data can be reduced.

Also, in the above-explained IP communication apparatus, the signal judging unit which performs the image motion judging operation judges whether or not each of the data contained in the IP packet and the moving picture data inputted from the camera contains an image motion; and the recording control unit controls the recording unit not to record both data contained in the IP packet and the moving picture data, which are equivalent to a non-action portion for a time duration longer than, or equal to a predetermined time. In accordance with the above-described structure, the data that is judged that the image motion is not present is not recorded in the recording unit, so that an amount of the recorded data can be reduced.

Also, in the above-described IP communication apparatus, the signal judging unit which performs the repetition judging operation judges whether or not each of the data contained in the IP packet and the voice data inputted from the microphone is repeated; and the recording control unit controls the recording unit in such a manner that only data portions which constitute data repetition sources within both the data contained in the IP packet and the voice data are recorded thereinto, and data portions subsequent to the data repetition sources are not recorded thereinto. In accordance with the above-described structure, the voice data that is judged as the repetition data is not recorded in the recording unit, so that an amount of the recorded data can be reduced.

Also, in the above-explained IP communication apparatus, the signal judging unit which performs the repetition judging operation judges whether or not each of the data contained in the IP packet and the moving picture data inputted from the camera is repeated; and the recording control unit controls the recording unit in such a manner that only data portions which constitute data repetition sources within both the data contained in the IP packet and the moving picture data are recorded thereinto, and data portions subsequence to the data repetition sources are not recorded thereinto. In accordance with the above-described structure, the moving picture data that is judged as the repetition data is not recorded in the recording unit, so that an amount of the recorded data can be reduced.

In the above-described IP communication apparatus, the IP communication apparatus is further comprised of: an operation unit by which a user of the IP communication apparatus performs a setting operation related to recording of the data contained in the IP packet, the voice data, and the moving picture data, and also, performs a setting operation related to the signal judging operations.

In the above-described IP communication apparatus, the user performs the setting operations by employing the operation unit in order to record at least one of data of a designated IP address contained in the IP packet, the voice data, and the moving picture data in the recording unit.

In the above-described IP communication apparatus, the IP communication apparatus is further comprised of: a speech recognizing unit for converting both the data contained in the IP packet and the voice data into character information; and the recording control unit records the character information in the recording unit.

In the above-described IP communication apparatus, the IP communication apparatus is further comprised of: a personal edge detecting unit for detecting a boundary between a person and a background from the data contained in the IP packet and the moving picture data; and the recording control unit overwrites data about a background portion other than the person by utilizing dummy data, and records the dummy-data-overwritten background data in the recording unit. In accordance with the above-described structure, such a background that is not wanted to be displayed when a moving picture is reproduced can be recorded as dummy data. Also, since a data amount of the dummy data is small, as compared with a data amount of the original background data, an amount of the recorded data can be reduced. Also, a speaker can be easily specified in a visual manner.

In the above-described IP communication apparatus, the recording control unit includes a time instant acquiring unit for acquiring time instant information when data is recorded in the recording unit; and the recording control unit records the data in the recording unit in combination with the acquired time instant information. In accordance with the above-explained structure, the time instant information can be added to the voice data and the moving picture data, which should be recorded, and then, the temporal information-added voice and moving picture data can be recorded.

In the above-described IP communication apparatus, the IP communication apparatus is further comprised of: a reproducing unit for reproducing to data recorded in the recording unit; and a reproducing control unit for controlling the reproducing operation by the reproducing unit. In accordance with the above-explained structure, both the recorded voice data and the recorded moving picture data can be reproduced.

In the above-described IP communication apparatus, the IP communication apparatus is further comprised of: an output unit for outputting voice data and moving picture data reproduced by the reproducing unit.

In the above-described IP communication apparatus, the output unit converts both the voice data and the moving picture data, which have been reproduced by the reproducing unit into an IP packet, and outputs the converted IP packet as IP packet data.

In the above-described IP communication apparatus, the IP communication apparatus is further comprised of: a character information displaying unit for displaying thereon the character information recorded in the recording unit. In accordance with the above-described structure, since the recorded data is displayed in the form of the character information on the screen under reproduction, the speech content can be easily understood in the visual manner.

In the above-described IP communication apparatus, the IP communication apparatus is further comprised of: a translating unit for translating one language of the character information recorded in the recording unit into another language thereof; and the character information display unit displays thereon the character information translated by the translating unit.

In accordance with the IP communication apparatus related to the present invention, even when the total number of bases functioning as the communication counter parties is increased, the amount of recorded data can be reduced. Also, the decoded data and the IP addresses extracted by the IP address extracting unit are recorded in the recording unit in relation to each other, and furthermore, the data entered from the input unit and the IP addresses acquired by the own IP address acquiring unit are recorded in the recording unit in relation to each other. As a result, when the recorded data is reproduced, the base of the speaker can be easily specified.

BRIEF DESCRIPTION OF THE DRAWINGS

FIG. 5 is a block diagram for showing an IP communication apparatus according to a third embodiment mode of the present invention, which is employed in the IP telephone voice/moving picture recording system.

DESCRIPTION OF THE PREFERRED EMBODIMENTS

Referring now to drawings, a description is made of embodiment modes of the present invention.

Figure 1:
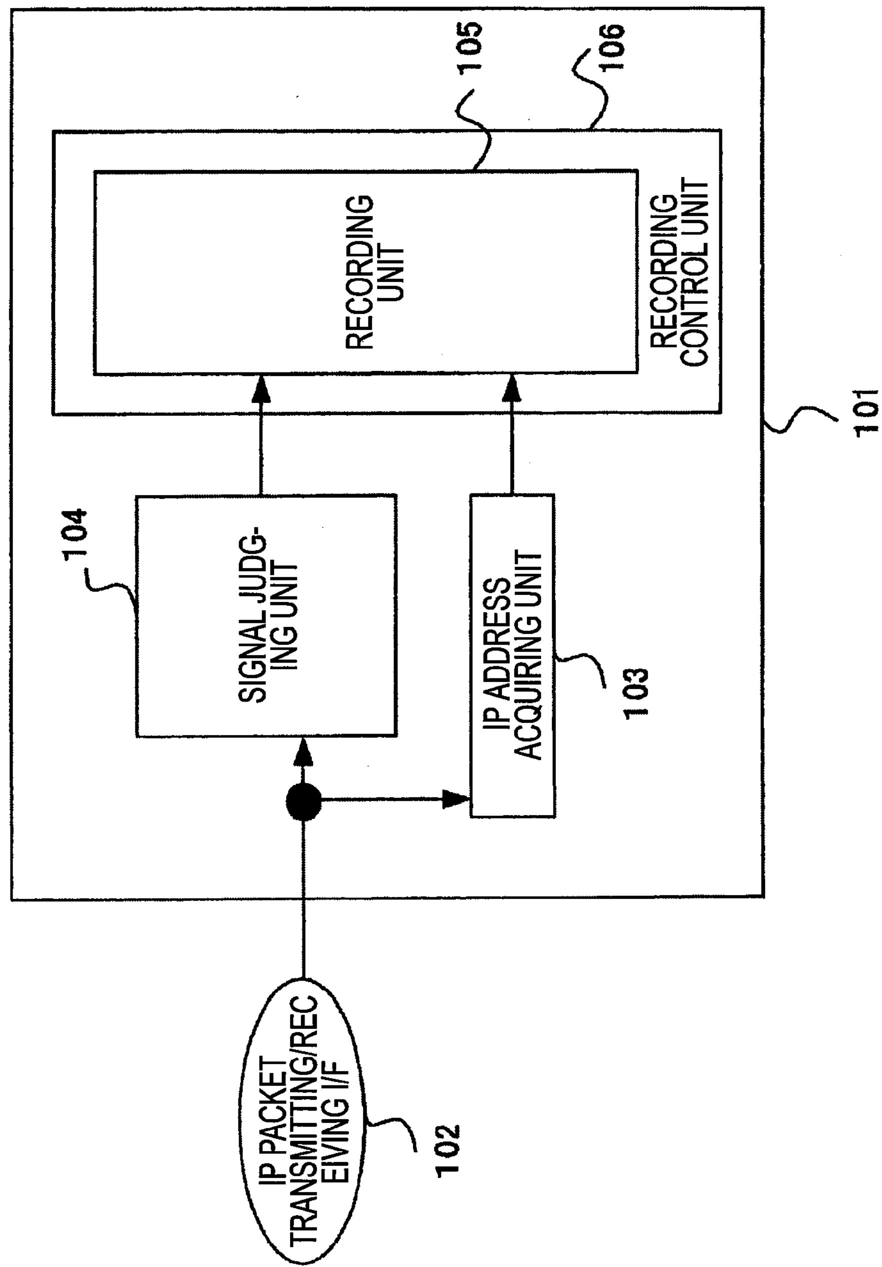
FIG. 1 is a block structural diagram for showing a feature of an IP communication apparatus of the present invention.

(Description of FIG. 1)

FIG. 1 is a block diagram for representing an IP (Internet Protocol) communication apparatus that is employed in an IP telephone voice/moving picture recording system. The IP communication apparatus 101, which is shown in FIG. 1 and is employed in the IP telephone voice/moving picture recording system, is equipped with an IP packet transmitting/receiving I/F 102, an IP address acquiring unit 103, a signal judging unit 104, and a recording control unit 106 containing a recording unit 105.

The IP address acquiring unit 103 acquires an IP address allocated to the IP communication apparatus 101. Voice data and moving picture data which are contained in the IP packet are inputted from the IP packet transmitting/receiving I/F 102 to the signal judging unit 104. The recording control unit 106 records the voice data and the moving picture data received from the IP packet transmitting/receiving I/F 102 in the recording unit 105 in relation to an IP address of a communication counter party.

Figure 2:
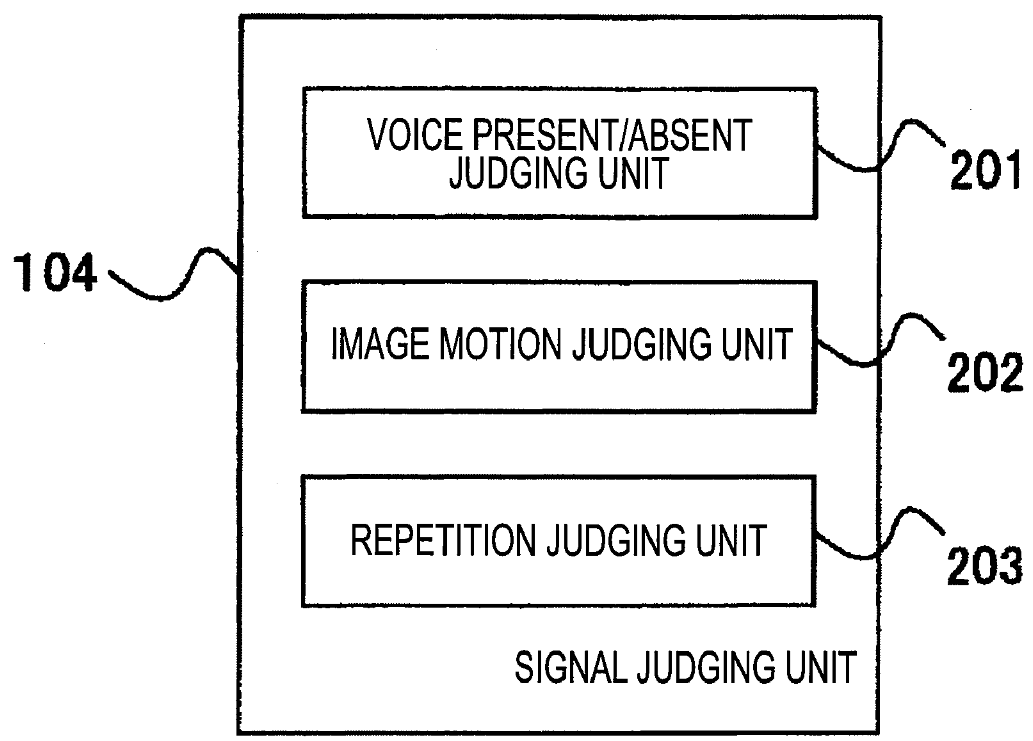
FIG. 2 is a block diagram for showing a feature of a signal judging unit of the present invention.

(Description of FIG. 2)

FIG. 2 is a diagram for indicating a detailed content of the signal judging unit 104 of FIG. 1. The signal judging unit 104 is equipped with any one, or two judging units selected from a voice present/absent judging unit 201, an image motion judging unit 202, and a repetition judging unit 203. Otherwise, the signal judging unit 104 is equipped with 3 sets of the above-described judging units 201, 202, and 203.

The voice present/absent judging unit 201 performs a voice present/absent judging operation in such a case that received data is voice data. The voice present/absent judging unit 201 does not cause the recording unit 105 to record voice data of such a base equivalent to a non-voice portion for a time duration longer than, or equal to a predetermined time. The image motion judging unit 202 performs an image motion present/absent judging operation in such a case that received data is moving picture data. The image motion judging unit 202 does not cause the recording unit 105 to record moving picture data of such a base equivalent to a non-motion portion for a time duration longer than, or equal to a predetermined time. The repetition judging unit 203 performs a repetition judging operation of received data. The repetition judging unit 203 does not cause the recording unit 105 to record voice data of such a base equivalent to a repeated speech for a time duration longer than, or equal to a predetermined time. Also, the repetition judging unit 203 does not cause the recording unit 105 to record moving picture data of such a base equivalent to the repeated speech for a time duration longer than, or equal to a predetermined time.

First Embodiment Mode

Figure 3:
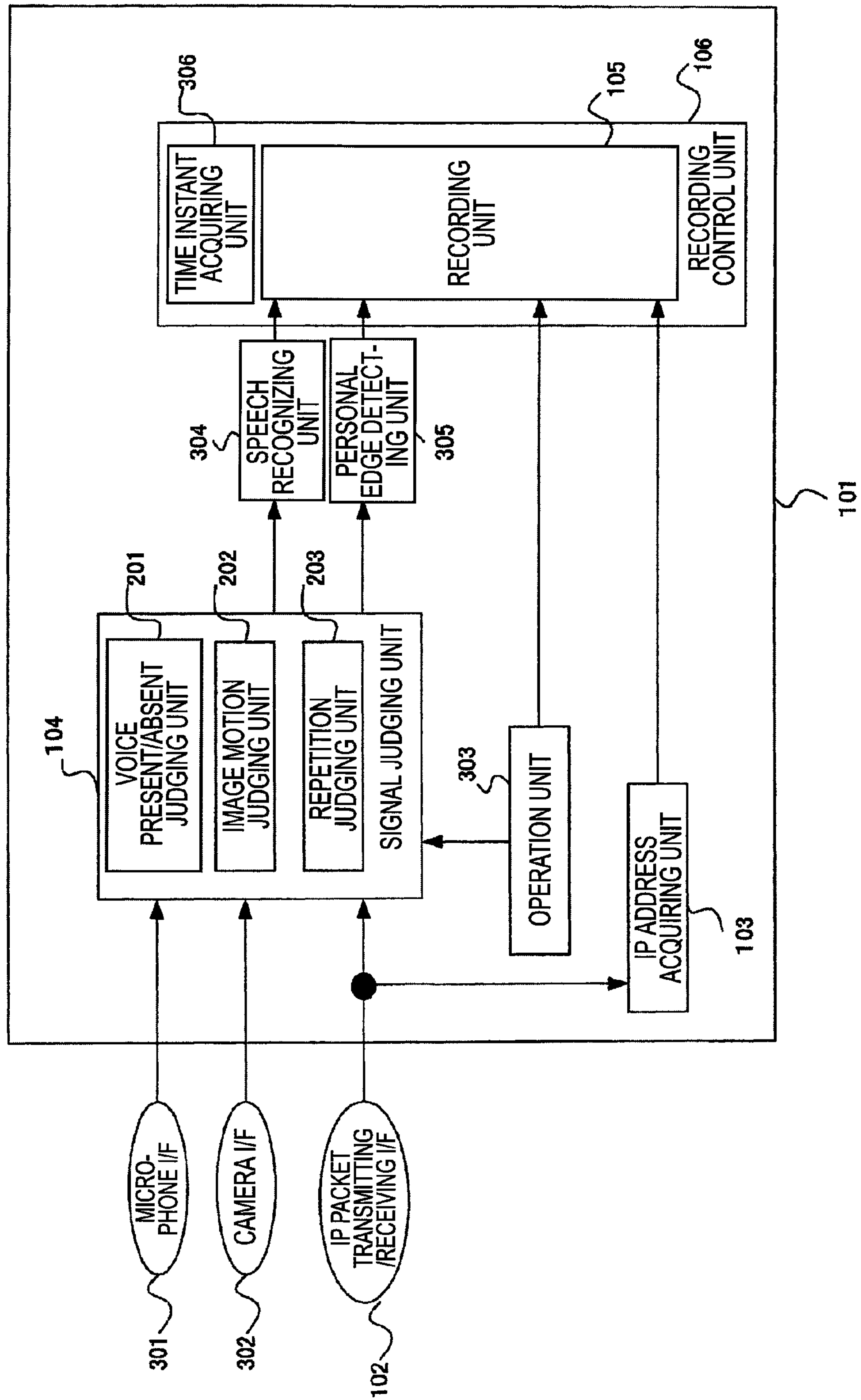
FIG. 3 is a block diagram for showing an IP communication apparatus according to a first embodiment mode of the present invention, which is employed in an IP telephone voice/moving picture recording system.

FIG. 3 is a block diagram for showing an IP communication apparatus which is employed in an IP telephone voice/moving picture recording system, according to a first embodiment mode of the present invention. The IP communication apparatus 101 of the first embodiment mode represented in FIG. 3, which is provided in the IP telephone voice/moving picture recording system, is equipped with an IP packet transmitting/receiving I/F 102, an IP address acquiring unit 103, a signal judging unit 104, a speech recognizing unit 304, a personal edge detecting unit 305, an operation unit 303, and a recording control unit 106. The signal judging unit 104 contains the voice present/absent judging unit 201, the image motion judging unit 202, and the repetition judging unit 203. The recording control unit 106 contains a time instant acquiring unit 306 and the recording unit 105. Also, a microphone I/F 301 and a camera I/F 302 have been connected to the signal judging unit 104. It should be understood that in FIG. 3, the same reference numerals have been given to structural elements which are commonly used in FIG. 1 and FIG. 2, and therefore, descriptions of the structural elements which are commonly used in FIG. 1 and FIG. 2 will be omitted.

The operation unit 303 is employed in order that a user of the IP communication apparatus 101 selects saving of any one, or both voice data and moving picture data. The voice present/absent judging unit 201 contained in the signal judging unit 104 judges both voice data inputted from the microphone I/F 301, and voice data received from the IP packet transmitting/receiving I/F 102. In such a case that the signal judging unit 104 judges that voice is present in the voice data judged by the voice present/absent judging unit 201, the judged voice data is furthermore entered to the repetition judging unit 203 in order that the repetition judging unit 203 judges whether or not the judged voice corresponds to repetition speech. The signal judging unit 104 instructs the recording control unit 106 to record only such a voice data which contains the voice and constitutes the repetition source, but not to record voice repetition portions subsequent to the repetition source. Also, the image motion judging unit 202 contained in the signal judging unit 104 judges both moving picture data inputted from the camera I/F 302, and moving picture data received from the I/P packet transmitting/receiving I/F 102. In such a case that the signal judging unit 104 judges that a motion is present within the moving picture judged by the image motion judging unit 202, the judged moving picture data is furthermore entered to the repetition judging unit 203 in order that the repetition judging unit 203 judges whether or not the judged moving picture corresponds to a repetition operation. The signal judging unit 104 instructs the recording control unit 106 to record only such a motion picture data which constitutes the motion and the repetition source, but not record moving picture repetition portions subsequent to the repetition source.

The speech recognizing unit 304 recognizes voice data and converts the recognized voice data to character information. The converted character information is recorded in the recording unit 105 by the recording control unit 106. The personal edge detecting unit 305 detects a boundary between a person and a background from moving picture data. With respect to the above-described moving picture data, the data about the background portion except for the person is overwritten with respect to dummy data, and the overwritten data is recorded in the recording unit 105 by the recording control unit 106. The time instant acquiring unit 306 contained in the recording control unit 106 acquires such a time instant information when the voice data and the moving picture data are recorded in the recording unit 105.

In accordance with the first embodiment mode, both the voice data and the moving picture data of the repetition portions are not recorded, but the data as to the background portion other than the person is overwritten by the dummy data. As a consequence, an amount of data to be recorded in the recording unit 105 can be furthermore reduced. Also, when the recorded data is reproduced, the speaker can be readily specified in a visual manner. Moreover, the character information is recorded in correspondence with the name of base (IP address) where the speakers participate in the IP telephone conference, the information as to the names of speakers and the recording time instants, and the voice data and the moving picture data while the proceedings are reproduced are recorded. As a result, when the recorded data are reproduced, the contents of the speakers can be readily understood in the visual manner.

Second Embodiment Mode

Figure 4:
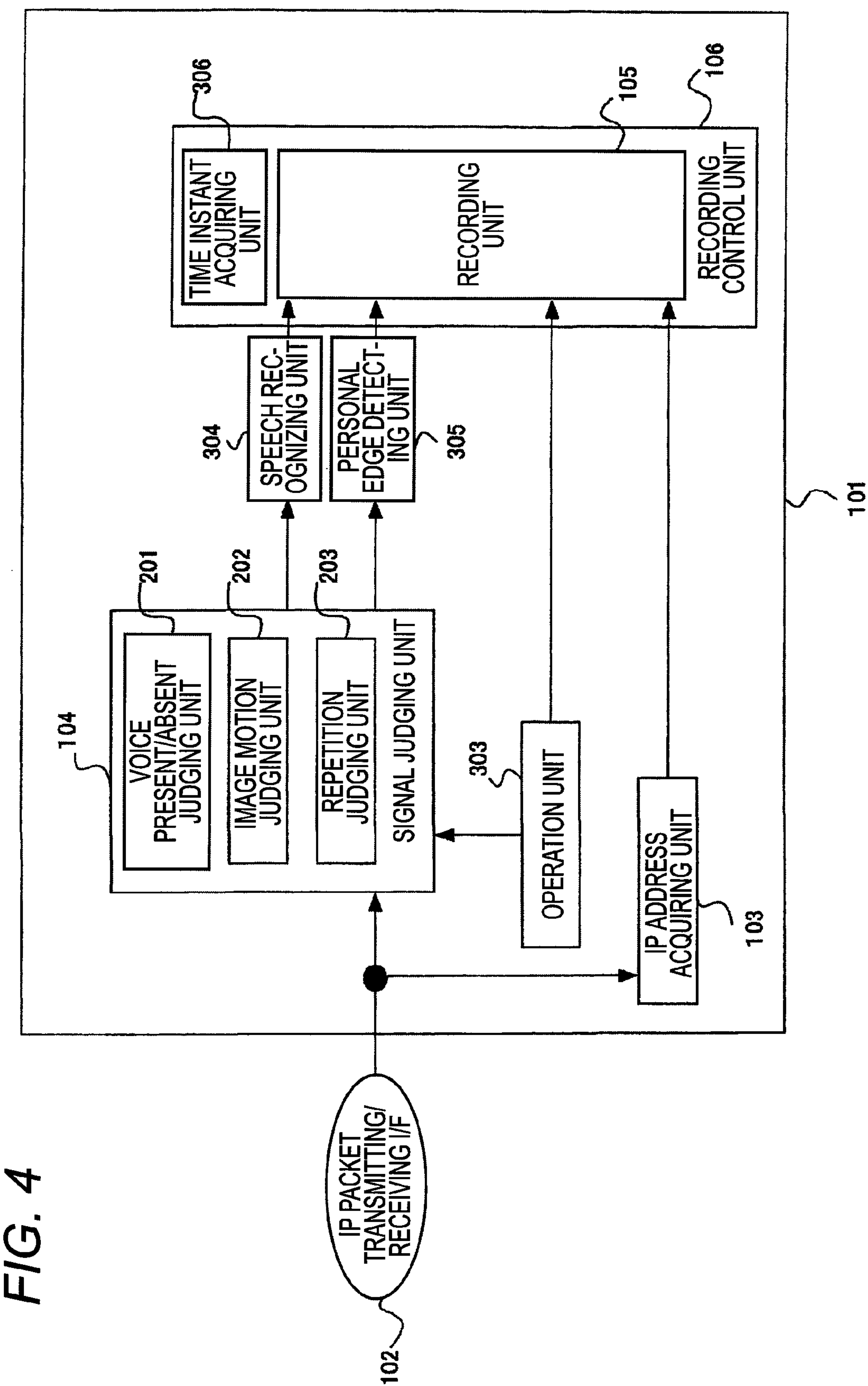
FIG. 4 is a block diagram for showing an IP communication apparatus according to a second embodiment mode of the present invention, which is employed in the IP telephone voice/moving picture recording system.

FIG. 4 is a block diagram for representing an IP communication apparatus which is employed in an IP telephone voice/moving picture recording system, according to a second embodiment mode of the present invention. The I/P communication apparatus 101 of the second embodiment mode shown in FIG. 4, which is provided in the IP telephone voice/moving picture recording system, is equipped with structural elements corresponding to the above-described structural elements equipped in the IP communication apparatus 101 shown in FIG. 3, from which the microphone I/F 301 and the camera I/F 302 have been eliminated. When communications are performed in such an IP communication apparatus 101 as a server which is not equipped with the microphone I/F 301 and the camera I/F 302, all of voice data and moving picture data are acquired from such data received from the IP packet transmitting/receiving I/F 102. It should be understood that in FIG. 4, the same reference numerals have been given to structure elements which are commonly used in FIG. 3, and therefore, descriptions of the structural elements which are commonly used in FIG. 3 will be omitted.

Third Embodiment Mode

FIG. 5 is a block diagram for showing an IP communication apparatus which is employed in an IP telephone voice/ moving picture recording system, according to a third embodiment mode of the present invention. The IP communication apparatus 101 of the third embodiment mode represented in FIG. 5, which is provided in the IP telephone voice/moving picture recording system, is further comprised of: a reproducing unit 501, a reproducing control unit 502, an output unit 503, a character information display unit 504, and a translating unit 505 in addition to the structural elements provided in the IP communication apparatus 101 shown in FIG. 4. While a monitor I/F 506 and a speaker I/F 507 have been connected to the output unit 503, the monitor I/F 506 has been connected to the character information display unit 504.

The reproducing unit 501 reproduces both voice data and moving picture data, which have been recorded in the recording unit 105. The reproducing control unit 502 controls reproducing operations in such a manner that voice data from which telephone calling/answering speech in telephone responses has been removed is reproduced, and also moving picture data from which the dummy data overwritten in the background portion has been removed is reproduced. The output unit 503 processes the voice data whose reproduction is controlled by the reproducing control unit 502 so as to output voice from the speaker I/F 507, and also processes the moving picture data whose reproduction has been controlled by the reproducing control unit 502 so as to display a moving picture on the monitor I/F 502. The character information display unit 504 displays character information on the monitor I/F 506 in response to both voice data and moving picture data of proceedings records of the IP telephone conference. Also, when the character information is displayed on the monitor I/F 506, the translating unit 505 translates one language expressed in this character information into another language thereof in response to a setting condition, and then, the character information display unit 504 displays the translated character information on the monitor I/F 506.

It should also be noted that the above-described IP communication apparatuses that are employed in the IP telephone voice/moving picture recording systems explained in the first to third embodiment modes may be alternatively realized by way of either hardware or software. Then, this software may be distributed by utilizing a software downloading manner. Alternatively, the above-described software may be recorded on a recording medium such as a CD-ROM, and then, the recorded CD-ROM may be distributed.

As apparent from the foregoing descriptions, the present invention is not limited only to the above-described embodiment modes, but may be modified in various manners, and therefore, these various modifications may be covered within the technical scope of the present invention.

The IP communication apparatus related to the present invention may be usefully employed as conference systems with employment of IP telephone terminals, but also, may be usefully utilized as systems for recording/reproducing telephone communication voice and telephone communication moving pictures in IP communication apparatuses, and servers.

What is claimed is:

1. An IP (Internet Protocol) communication apparatus employed in a voice/moving picture recording system, the IP communication apparatus comprising:

an IP packet transmitting/receiving I/F (Interface) for transmitting/receiving an IP packet;

an IP address acquiring unit for acquiring an IP address corresponding to a transmission source of the IP packet;

a signal judging unit for performing a signal judging operation by employing data contained in the IP packet;

a recording unit for recording the data in relation to the IP address based upon a judgment result made by the signal judging unit; and a recording control unit for controlling the recording unit, wherein:

the signal judging unit is configured to perform at least one of a voice present/absent judging operation, an image motion judging operation and a repetition judging operation, the voice present/absent judging operation judges whether, when the data contains voice data, the voice data contains a non-voice portion, and the image motion judging operation judges whether the data contains moving picture data.

2. The IP communication apparatus as claimed in claim 1, wherein said signal judging unit performs said signal judging operation by employing voice data inputted from a microphone provided in said IP communication apparatus.

3. The IP communication apparatus as claimed in claim 2, wherein:

said signal judging unit which performs said voice present/absent judging operation judges whether or not each of the data contained in said IP packet and the voice data inputted from said microphone contains a voice, and said recording control unit controls said recording unit not to record both data contained in said IP packet and said voice data, which are equivalent to a non-voice portion for a time duration longer than, or equal to a predetermined time.

4. The IP communication apparatus as claimed in claim 2, wherein:

said signal judging unit which performs said repetition judging operation judges whether or not each of the data contained in said IP packet and the voice data inputted from said microphone is repeated, and said recording control unit controls said recording unit in such a manner that only data portions which constitute data repetition sources within both said data contained in the IP packet and said voice data are recorded thereinto, and data portions subsequent to said data repetition sources are not recorded thereinto.

5. The IP communication apparatus as claimed in claim 1, wherein said signal judging unit performs said signal judging operation by employing moving picture data inputted from a camera provided in said IP communication apparatus.

6. The IP communication apparatus as claimed in claim 5, wherein:

said signal judging unit which performs said image motion judging operation judges whether or not each of the data contained in said IP packet and the moving picture data inputted from said camera contains an image motion, and said recording control unit controls said recording unit not to record both data contained in said IP packet and said moving picture data, which are equivalent to a non-action portion for a time duration longer than, or equal to a predetermined time.

7. The IP communication apparatus as claimed in claim 5, wherein:

said signal judging unit which performs said repetition judging operation judges whether or not each of the data contained in said IP packet and the moving picture data inputted from said camera is repeated, and said recording control unit controls said recording unit in such a manner that only data portions which constitute data repetition sources within both said data contained in the IP packet and said moving picture data are recorded thereinto, and data portions subsequence to said data repetition sources are not recorded thereinto.

8. The IP communication apparatus as claimed in claim 1, further comprising:

an operation unit by which a user of said IP communication apparatus performs a setting operation related to recording of said data contained in said IP packet, said voice data, and said moving picture data, and performs a setting operation related to the signal judging operations.

9. The IP communication apparatus as claimed in claim 8 wherein the user performs said setting operations by employing said operation unit in order to record at least one of data of a designated IP address contained in said IP packet, said voice data, and said moving picture data in said recording unit.

10. The IP communication apparatus as claimed in claim 1, further comprising:

a speech recognizing unit for converting both the data contained in said IP packet and said voice data into character information, wherein said recording control unit records the character information in said recording unit.

11. The IP communication apparatus as claimed in claim 1, further comprising:

a personal edge detecting unit for detecting a boundary between a person and a background from the data contained in said IP packet and said moving picture data, wherein said recording control unit overwrites data about a background portion other than said person by utilizing dummy data, and records the dummy-data-overwritten background data in said recording unit.

12. The IP communication apparatus as claimed in claim 1, wherein:

said recording control unit includes a time instant acquiring unit for acquiring time instant information when data is recorded in said recording unit, and said recording control unit records the data in said recording unit in combination with said acquired time instant information.

13. The IP communication apparatus as claimed in claim 1, further comprising;

a reproducing unit for reproducing to data recorded in said recording unit; and a reproducing control unit for controlling the reproducing operation by said reproducing unit.

14. The IP communication apparatus as claimed in claim 13, further comprising:

an output unit for outputting voice data and moving picture data reproduced by said reproducing unit.

15. The IP communication apparatus as claimed in claim 14, wherein said output unit converts both the voice data and the moving picture data, which have been reproduced by said reproducing unit into an IP packet, and outputs the converted IP packet as IP packet data.

16. The IP communication apparatus as claimed in any one of claim 13, further comprising:

a character information displaying unit for displaying thereon the character information recorded in said recording unit.

17. The IP communication apparatus as claimed in claim 16, further comprising:

a translating unit for translating one language of the character information recorded in said recording unit into another language thereof, wherein said character information display unit displays thereon the character information translated by said translating unit.

* * * * *